United States Patent [19]

Titmas

[11] Patent Number: 4,594,164

[45] Date of Patent: Jun. 10, 1986

[54] METHOD AND APPARATUS FOR CONDUCTING CHEMICAL REACTIONS AT SUPERCRITICAL CONDITIONS

[76] Inventor: James A. Titmas, 4380 Norona Dr., Stow, Ohio 44224

[21] Appl. No.: 737,162

[22] Filed: May 23, 1985

[51] Int. Cl.[4] .......................... C02F 1/02; C02F 1/38; C02F 1/72
[52] U.S. Cl. ..................... 210/741; 166/57; 166/302; 210/170; 210/175; 210/220; 210/512.1; 422/129
[58] Field of Search ............. 203/11; 166/302, 305 D, 166/369, 57, 61; 210/170, 175, 187, 195.1, 220, 741, 742, 761, 766, 787, 205, 512.1, 758; 422/129

[56] References Cited

U.S. PATENT DOCUMENTS

| | | | |
|---|---|---|---|
| 3,449,247 | 6/1969 | Bauer | 210/747 |
| 3,606,999 | 9/1971 | Lawless | 423/659 |
| 3,853,759 | 12/1974 | Titmas | 210/600 |
| 4,217,211 | 8/1980 | Crane | 210/170 X |
| 4,272,383 | 6/1981 | McGrew | 210/741 |
| 4,338,199 | 7/1982 | Modell | 210/721 |

Primary Examiner—Richard V. Fisher
Assistant Examiner—W. Gary Jones
Attorney, Agent, or Firm—Renner, Kenner, Greive, Bobak & Taylor

[57] ABSTRACT

Continuously flowing water contaminated with organic and inorganic materials is treated by being fed to the top of a downdraft column (25) of a hydraulic column reactor (10) and conducted to the bottom thereof to a reaction chamber (18). The pressure and temperature conditions in the reaction chamber (18) are maintained at approximately the necessary pressure and temperature to create supercritical water conditions to thereby treat the water and its lower specific gravity. The treated water can then be separated in the reaction chamber (18) into a particulate and precipitate enriched portion and a particulate and precipitate depleted portion, which portions are conducted upwardly in separate updraft columns (29, 30) and continuously removed therefrom.

39 Claims, 3 Drawing Figures

METHOD AND APPARATUS FOR CONDUCTING CHEMICAL REACTIONS AT SUPERCRITICAL CONDITIONS

TECHNICAL FIELD

This invention relates to a method and apparatus which promotes chemical reactions, such as the treatment of water contaminated with organic and inorganic materials, at supercritical temperature and pressure conditions. More particularly, this invention utilizes the triple point of water at the threshold of the supercritical condition, that is, the point at which supercritical water, steam, and high pressure water all exist simultaneously, to effect a separation of inorganic salts from the water not otherwise possible.

BACKGROUND ART

It has long been known that an increase in the speed and efficiency of many chemical reactions can be induced by subjecting the substances involved to greatly increased pressure and temperature conditions. At one time it was popular to develop the desired conditions by utilizing autoclaves to confine a batch of the material to be treated which, when heated, gave off vapors and pressurized the container. Alternatively, tanks were pressurized with pumps while being heated. These types of systems have been falling into disuse because of their lack of capacity due to the batch nature of the process, and because of the mechanical maintenance intensity inherent in the use of specialized pumps and outlet throttling devices.

The autoclave and pumped pressure tanks to create high pressure and temperature conditions have generally been replaced by the art of using a hydraulic column to develop the desired conditions. The teachings in this art are typified by Bauer U.S. Pat. No. 3,449,247; Lawless U.S. Pat. No. 3,606,999; Titmas U.S. Pat. No. 3,853,759; and McGrew U.S. Pat. No. 4,272,383.

However, the hydraulic column art has not taught the ability to operate, or appreciated the advantages of operating, at the state of water known as the threshold supercritical point of temperature and pressure. As is known in the art this threshold point is the point of temperature and pressure at which the phase barrier between water and vapor no longer exists. Supercritical water, steam and high pressure water exist simultaneously and gases, such as oxygen, water, and oils are fully miscible in all proportions and inorganic salts are virtually insoluable. This condition begins to occur at a pressure of 3207 psi and a temperature of 706° F.

Furthermore, these existing hydraulic column methods lack acceptable means to achieve sustained supercritical conditions. For example, the Bauer patent teaches that if the fundamental energy in the fluid stream is insufficient, fuel, in the form of combustible refuse, must be added to induce wet combustion. However, the addition of such combustible refuse is impractical and unmanageable since the inconsistent and irregular BTU content of combustible refuse does not enable one to provide a uniform energy control on a continuous basis to sustain the supercritical condition. Similarly, the Titmas patent is limited to only certain chemical reactions in that it teaches the advantages of limiting combustion by restricting the process to oxygen inherently present in the material. For many processes which can take place at the supercritical point, additional oxygen will be required. Furthermore, those processes which teach the addition of steam heat, such as taught in the Titmas patent, cannot be operated at the supercritical point since steam condenses at that point and no net heat is injected.

Likewise, the teachings of the McGrew patent fall short of suggesting a process which can be carried on at the threshold of the supercritical conditions. The McGrew patent teaches the addition of combustible gases in the downdraft of the hydraulic column in an attempt to sustain the heat needs by substantially complete wet combustion of the organic content of the material to be treated. Such addition of oxygen in the downdraft cannot result in a controlled reaction at the supercritical threshold point because the downdraft heats too quickly resulting in a loss of peak pressure and increased heat losses to the strata. The result of the McGrew process is a less than average contaminent destruction since the wet combustion is initiated at too low a temperature, a temperature far below that of the supercritical range. Furthermore, since the downdraft of McGrew is heated, it loses its advantageous effect of cooling the updraft.

In short, none of the hydraulic column prior art is capable of efficient operation at the threshold point of the supercritical range. Nor does any of this art recognize the fact that even if it could operate at supercritical conditions, the inorganic salts, inherently present in contaminated waters, could be readily separated in the hydraulic column on a continuous basis.

The only art of which I am aware that even considers the supercritical range and the advantages thereof is Modell U.S. Pat. No. 4,558,199. The Modell patent does not teach the use of a hydraulic column to effect the necessary pressure but rather utilizes pumps to induce pressure in an above-the-ground vessel. Actually, the Modell patent teaches pressurizing the vessel to a much higher pressure than needed at the supercritical threshold point with wet combustion sustaining a higher temperature than that needed at the threshold point. Modell thus operates at temperatures and pressures well into the supercritical range. This excessive and inefficient energy demand is necessary because Modell teaches conducting the reacted material to a separate conventional separation chamber during which time the material is inherently cooling. Once at the separation chamber, the material is hopefully still in the supercritical range so that particulates can settle out. However, Modell does not teach any means of separating the particulates from the high pressure environment on a continuous basis. This problem remains unsolved as the pressure drop from at least 3234 psi cannot be controlled or contained by known throttling devices as the particulates and gas bubbles flashing from the supercritical fluid effectively move through the throttling device at sonic velocities eroding and destroying the device itself.

The process according to the Modell patent is also plagued by problems inherent in essentially all nonhydraulic column reactors and in particular, the problem of having to efficiently pump abrasive and hostile waste materials to an extremely high pressure which cannot economically be done in any high quantities. Thus, Modell would operate with possibly lower quantities of higher concentrated wastes, such as the 5000 to 25000 parts per million concentration he discusses, whereas most waste streams, in need of continuous processing in high volumes, contain only 300 to 3000 parts per million of organic contaminants.

As a result of the shortcomings of the prior art, the human environment continues to degenerate due to the accumulation of toxic and petrochemical wastes wherein no present method of ultimate destruction is practicable and many production processes are inefficient by excessive use of energy, batch processing, or high pressure containment problems. For example, waste oils mixed with brakish water exhibiting a high ratio of Chemical Oxygen Demand (C.O.D.) compared to its Biochemical Oxygen Demand (B.O.D.) are not amenable to conventional biological treatment and can include hundreds of individual chemicals determined to be carcinogenic or otherwise toxic. Some of these materials are not now included on the Environmental Protection Agency's list for control not because they do not represent a clear and present danger to health, but because there is no practical method for their destruction. The energy content inherent in the typical waste stream is neither sufficiently consistent, nor adequate, to sustain even existing hydraulic column processes.

DISCLOSURE OF THE INVENTION

It is thus a primary object of the present invention to provide a method and apparatus for treating materials, such as water contaminated with organic and inorganic materials, at approximately the threshold point of supercritical conditions of temperature and pressure.

It is another object of the present invention to provide a method and apparatus, as above, which continously separates a portion of the inorganic salts from the material.

It is a further object of the present invention to provide a method and apparatus, as above, which promotes chemical reactions altering the undesirable aspects of contaminates in water using starved wet combustion.

It is still another object of the present invention to provide a method and apparatus, as above, utilizing a uniform heat input from a heat source located in the reaction zone of a hydraulic column reactor.

It is yet another object of the present invention to provide a method and apparatus, as above, in which the hydraulic column is within but isolated from the surrounding strata.

It is an additional object of the present invention to provide a method and apparatus, as above, which includes the ability to control radiant and convective heat losses from the reactor to the strata.

It is a still further object of the present invention to provide a method and apparatus, as above, which can handle large volumes of waste water continously, without the need for high pressure pumping devices, while retaining much of the heat and pressure energy input thereby increasing yields of known processes.

These and other objects of the present invention, which will become apparent from the description to follow, are accomplished by the improvements hereinafter described and claimed.

In general, according to the method and apparatus of the concept of the present invention, as used for treating a continuously flowing water contaminated with organic and inorganic materials, the water to be treated is first fed to the top of a hydraulic downdraft column and conducted to the bottom thereof to a reaction chamber. The pressure and temperature conditions in the reaction chamber are maintained at approximately the necessary pressure and temperature conditions to create supercritical water conditions to thereby treat the water and lower its specific gravity. The treated water is then conducted to a separate updraft column and continuously removed therefrom. If desired, the particulate and precipitate enriched portion of the treated water may be separated from the particulate and precipitate depleted portion in the reaction chamber.

PREFERRED EMBODIMENT FOR CARRYING OUT THE INVENTION

Figure 1:
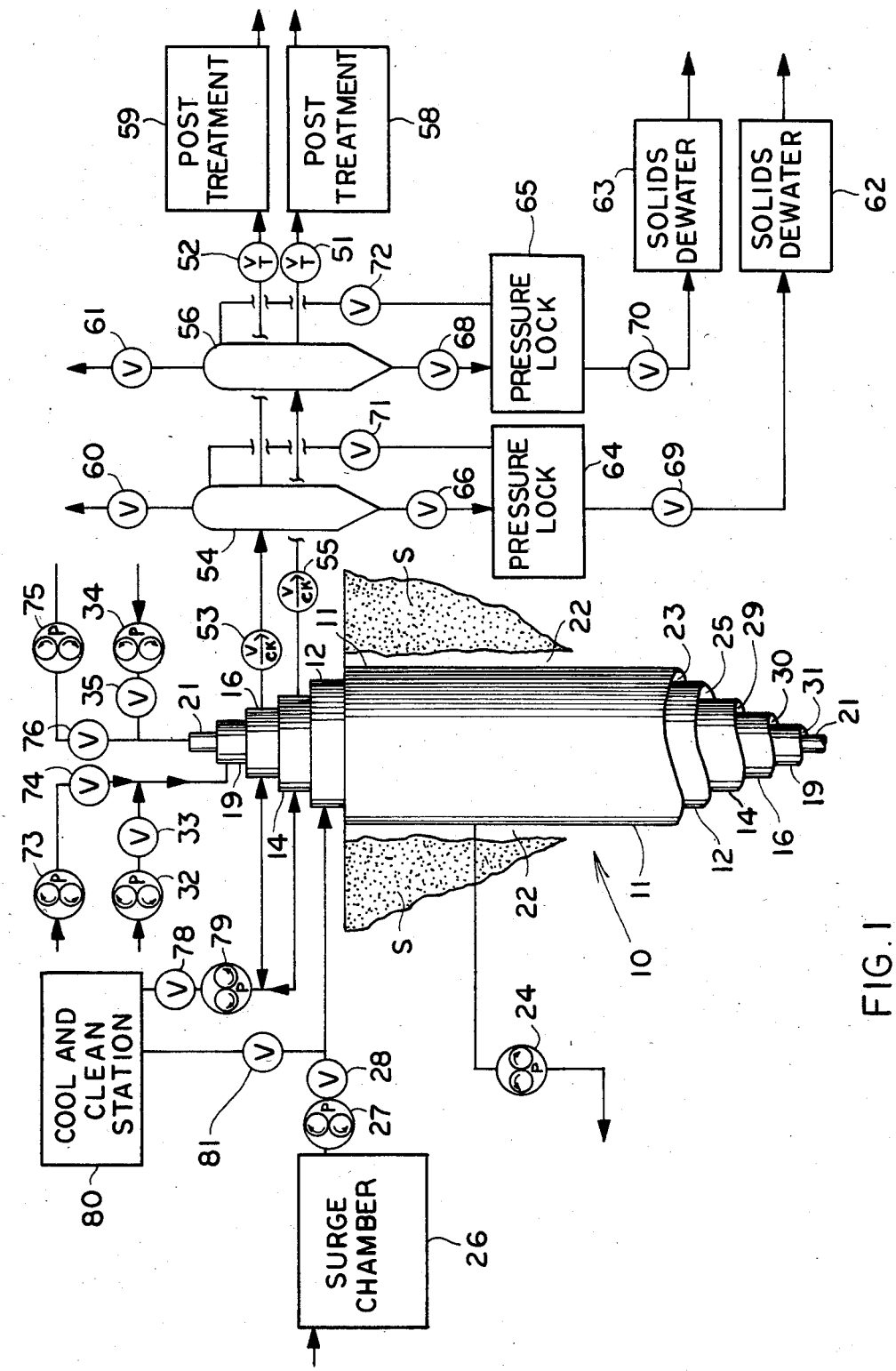
FIG. 1 is a schematic diagram of the top portion of a hydraulic column reactor according to the concept of the present invention.
Figure 2:
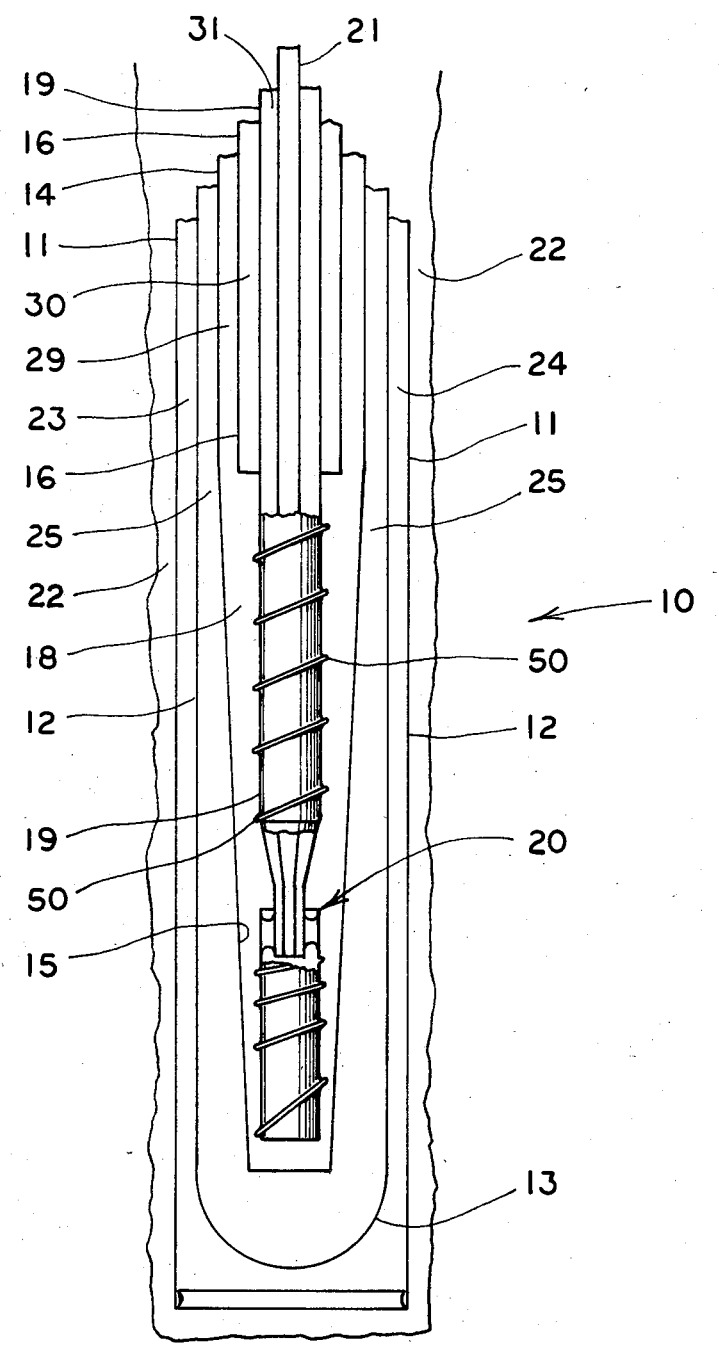
FIG. 2 is a schematic diagram of the bottom portion of the hydraulic column shown in FIG. 1 and in particular showing the reaction chamber.

The apparatus for conducting chemical reactions at the threshold of supercritical water conditions is shown in the form of a hydraulic column and indicated generally by the numeral 10, the top portion of which is shown in FIG. 1 and the bottom portion of which is shown in FIG. 2. An outer evacuated casing 11 is spaced from the strata S in a bore in the earth. Concentric with and spaced from casing 11 is a downdraft casing 12 which is closed at its lower end (FIG. 2), as at 13. Concentric with casings 11 and 12 and spaced from casing 12 is an updraft casing 14 which is sloped at its lower end, as at 15, for reasons to be hereinafter described. Concentric with casings 11, 12 and 14 and spaced from casing 14 is a second updraft casing 16 which terminates at its lower end (FIG. 2) at the top of a reaction chamber 18. Reaction chamber 18 extends generally from the lower end of casing 16 to the closed end 13 of casing 12. Concentric with casings 11, 12, 14 and 16 is a fuel casing 19 which extends downward to a burner assembly located within reaction chamber 18 and generally indicated by the numeral 20. Concentric with casings 11, 12, 14, 16 and 19 is an oxygen pipe 21 which extends downward to burner assembly 20.

The space 22 between the strata S and casing 11 may be filled with a thermally stable grout to seal and insulate the hydraulic column from strata S. The annulus 23 between casing 11 and casing 12 can be evacuated, to the greatest extent possible, by an evacuating pump 24. Evacuation to significantly less than one atmosphere provides good insulation and insures a dry space for the protection of thermal probes, strain gauges and the like which may be necessary to monitor and control operation. Furthermore, casing 11 may be provided with a heat reflective inner surface to direct heat back toward the center of the device.

The downdraft annulus 25 between casings 12 and 14 receives the material to be treated from surge chamber 26 through normally open valve 28. At times, the feed may be assisted by delivery pump 27 as will hereinafter be described. The annulus 29 between updraft casings 14 and 16 receives, in a manner to be hereinafter described, the particulate and precipitate enriched portion of the treated material from reaction chamber 18 while the annulus 30 between updraft casing 16 and fuel casing 19 receives the particulate and precipitate depleted portion of the treated material from reaction chamber 18. The annulus 31 between casing 19 and pipe 21 receives fuel, which may be in the form of liquid propane, via pump 32 through normally open valve 33. Pipe 21 is supplied with oxygen by pump 34 through normally open valve 35.

Figure 3:
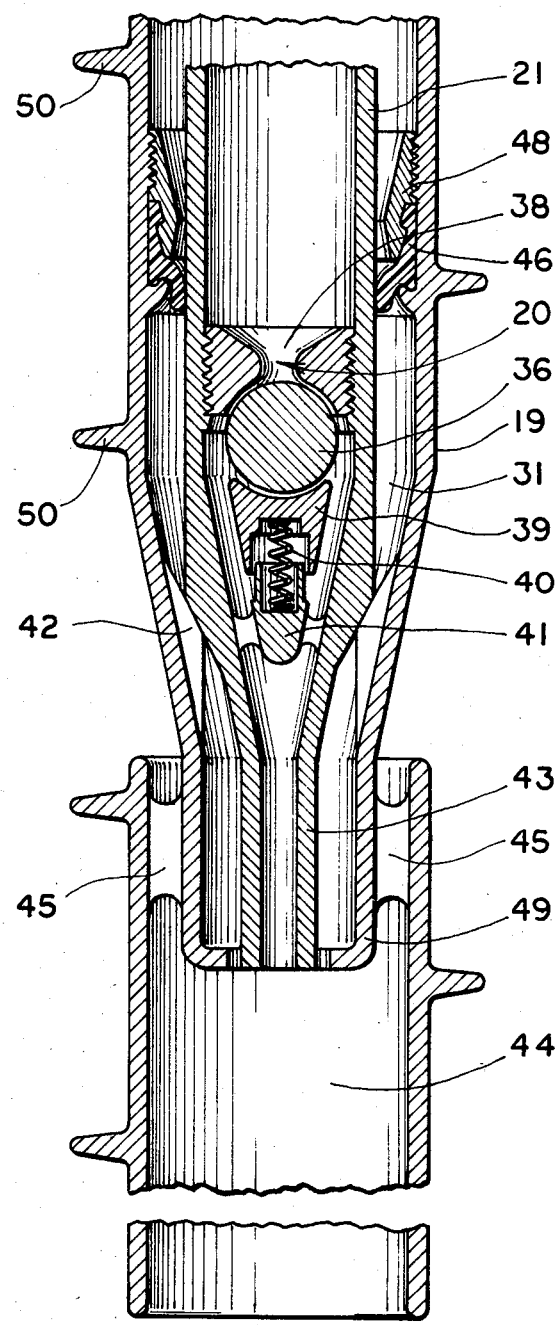
FIG. 3 is an enlarged and more detailed view of a portion of the reaction chamber shown in FIG. 2 including more details of the burner in the chamber.

The oxygen from pipe 21 and fuel from annulus 31 are directed to burner assembly 20 best shown in FIG. 3. The oxygen feed in pipe 21 is directed to a one-way flow ball valve 36 restrained at its top and by retainer 38 threaded into the inside of pipe 21 and supported and sealed at its lower end by seat 39. Seat 39 is biased upwardly by spring 40 supported on spider 41 affixed to the inside of pipe 21. Pipe 21 is supported at its lower end by shoulder 42 on the inside of fuel casing 19. Pipe 21 terminates in a tapered nozzle 43 which jets the oxygen into a combustion chamber 44 supported by spider 45 and communicating with reaction chamber 18. At the same time fuel, for example propane, is delivered in annulus 31 through compressible ring 46 held in place by retainer 48 threaded into casing 19. Ring 46 prevents oxygen from entering annulus 31. The fuel in annulus 31 jets into combustion chamber 44 through nozzle 49 enveloping the oxygen stream.

Although the hydraulic column 10 is capable of treating or chemically reacting many materials, it will be described herein as treating water contaminated with organic and inorganic materials commonly known as waste water or waste streams. Typical waste water may have a Chemical Oxygen Demand of two thousand parts per million and include chlorinated hydrocarbons, phenols, biphenols, organic acids, alcohols, mercaptons, bioorganic debris such as carbohydrates, cellulose/starches, proteins/amino acids, viruses and bacteria, oils, greases, inorganic salts such as sodium chloride or calcium chloride, sulphates, carbonates, and phosphates or amonium salts.

The waste water is received in surge chamber 26 and fed to downdraft annulus 25 where it descends at a rapid rate undergoing some pyrolysis and oxidation due to the presence of some heat and residual components typically in the stream. At this point it may also be desirable to feed a chemical agent into the downdraft stream to prevent char deposition of organic debris on the downdraft walls as would be evident to one of ordinary skill in the art. Pressure increases along with temperature until the fluid reaches a depth of approximately 11,000 feet at which point the pressure will be at approximately the threshold of the supercritical range. As the fluid reaches the bottom and moves around the sloped lower end 15 of casing 14 it encounters the reaction chamber 18 where heat may be added from burner assembly 20. However, if the concentration of the contaminants of the waste stream is sufficient, adequate heat may be derived from the partial oxidation of the contaminants of the waste stream without the need for continuous heat from burner assembly 20. Heat may be controlled, in a manner evident to one skilled in the art, such that a temperature of approximately 706° F. may be maintained which, coupled with the approximate pressure of 3207 psig, causes reactions at the threshold of the supercritical range.

The heated and reacted fluid, being of lesser specific gravity, will rise in reaction chamber 18 between sloped wall 15 of casing 14 and the outer wall of fuel casing 19. A spiral rib or baffle 50, formed around the outside wall of casing 19 and extending upward in approximately two-thirds of the length of reaction chamber 18, will cause the reacted fluid to spin. This spinning, coupled with sloped wall 15, deliberately induces multiple distinct zones of supercritical fluids with centrifugal force throwing the heavier fluids and particulates out against wall 15. The innermost fluid consists of threshold supercritical water and gases and is essentially depleted of particulate and precipitate material while the outermost fluid is enriched in its inorganic salt content.

This separation of material continues as the fluid moves upwardly over baffle 50. As the fluid reches the top third of the reaction chamber 18, suitable separation exists and baffle 50 stops so that undue turbulence, which might cause a remix, is not created as the materials enter updraft annuli 29 and 30. Thus, the particulate enriched fluid travels up annulus 29 while the particulate depleted fluid travels up annulus 30.

The flow rate of fluid in hydraulic column 10 is determined by the fluid level in surge chamber 26 which is controlled by throttled valves 51 and 52 (FIG. 1) in the output lines of the fluid in annulus 29 and annulus 30, respectively. As would be evident to one skilled in the art, valves 51 and 52 can be designed to automatically open further if the level of fluid in surge chamber 26 is above a predetermined amount thereby increasing the flow rate, and automatically close further if the level of fluid is below the predetermined amount to decrease the flow rate.

The particulate depleted portion of the fluid passes through a check valve 53 to a separation tank 54 and the particulate enriched portion of the fluid passes through a check valve 55 to a separation tank 56. The solids in the particulate enriched portion and any solids which may remain in the particulate depleted portion are therefore allowed to settle in tanks 56 and 54, respectively, with the liquids passing through to post treatment areas 58 and 59. As is well known, such post treatment can be in the form of anaerobic digestion, or aerobic digestion and the like.

Tanks 54 and 56 are provided with gas outlet control valves 60 and 61, respectively, to remove the gases therefrom. The solids at the bottom of tanks 54 and 56 are removed to solids dewatering lagoons or filters 62 and 63, respectively, from where they can be disposed of permanently. However, because tanks 54 and 56 will normally be at a high pressure, close to that of hydraulic column 10, for example, about 500 psi, pressure lock chambers 64 and 65 are provided, respectively, between tank 54 and dewatering lagoon 62 and between tenk 56 and dewatering lagoon 63.

In normal operating conditions, tanks 54 and 56 are at a high pressure and chambers 64 and 65 at atmospheric pressure with valve 66 between tank 54 and chamber 64 closed and valve 68 between tank 56 and chamber 65 closed. Also closed is valve 69 between chamber 64 and dewatering lagoon 62 and valve 70 between chamber 65 and dewatering lagoon 63. Moreover, the top of tank 54 is connected through normally closed valve 71 to chamber 64 and the top of tank 56 is connected through normally closed valve 72 to chamber 65.

When it is desired to remove solids from tanks 54 and/or 56 valves 71 and/or 72 may be opened to slowly equalize the pressure between tank 54 and chamber 64 and/or tank 56 and chamber 65. Then with valves 71 and/or 72 still open valves 66 and/or 68 may be opened whereby the solids may pass to chambers 64 and/or 65. Then valves 66 and/or 68 and valves 71 and/or 72 may be closed and any remaining excess gas in chambers 64 and/or 66 may be bled off slowly to atmospheric pressure. As would be understood by one skilled in the art, gases venting to atmospheric pressure from the reacted materials may be conducted to a fume incinerator or similar odor control device (not shown). Valves 69 and/or 70 may then be safely opened to transmit the solids to dewatering lagoons 62 and/or 63.

The above description has, for the most part, related to the continuous operation of hydraulic column 10 after the process is initiated. To initiate the process, it is first necessary to fill the entire hydraulic column, that is, downdraft annulus 25, updraft annulus 29, and updraft annulus 30 with the material to be treated. With throttle valves 51 nd 52 closed to prevent loss of the material, a small quantity of a start up fuel is sent by pump 73 through valve 74 through annulus 31 to burner assembly 20 while at the same time a start up oxidizer is sent by pump 75 through valve 76 through pipe 21 to burner assembly 20. The start up fuel and oxidizer can be of any type which have the capacity to react exothermally on contact. Normal fuel and oxygen are then delivered by pumps 32 and 34, respectively, behind the ignition fuels to sustain the energy input. The fuel feed rate is gradually increased, preferably up to about four million BTU per hour until the reaction chamber 18 and the fluid therein is brought up to supercritical temperature, which may take several days, as sensed by conventional thermocouples and the like.

Throttle valves 51 and 52 may then be slowly opened to permit movement of the hotter fluid at the bottom of the column up the updraft annuli 29 and 30 while cooler fluid flows from surge chamber 26 down downdraft annulus 25. The cooler and significantly gas free downdraft fluids, being heavier than the updraft fluids, displaces the updraft fluids establishing the dynamic forces to thereafter render the process continuous.

From time to time it may be necessary to clean the hydraulic column and its components, as when, for example, aggressively adhesive precipitates, such as calcium sulfate, have accumulated to a significant depth, for example, one-sixteenth to one-eighth of an inch, in the downdraft annulus 25. At this time, a normally closed valve 78 may be opened and cooling water transferred by pump 79 to updraft annuli 29 and 30 from a cool and clean cycle station 80. This displaces the hot fluid in the system which can be transferred back to surge chamber 26. When the hydraulic column has cooled sufficiently, for example to under 200° F., valve 28 can be closed and a recycle valve 81 opened. Then pump 79 may be connected at station 80 to a nitric acid wash which is pumped through the system and back to station 80 through valve 81 for recycle. The nitric acid wash dissolves the sediment accumulations and with a settling out of these sediments, the wash can be partially reused at the next cleaning cycle. The fact that the bath is forced into the updraft annuli 29 and 30 and up the downdraft annulus 25 aids in the cleaning process. The hydraulic column is then purged with water to be treated and restarted for further fluid treatment.

While the above described process and apparatus is totally and efficiently operable on most waste streams, at times one might encounter waste streams with either high or low organic and inorganic content such that the process described herein may have to be altered slightly. For example, if the content of the waste stream does not have enough internal chemical energy to sustain the process, the stream may have to be concentrated with organic materials or more continuous heat energy supplied. Other streams may have the requisite chemical energy but may be too thick with suspended materials such as organic sludges, silts or clays. These may need to be diluted and/or assisted in flow by pump 27.

This potential pretreatment of a stream and other technical considerations such as structural support, thermal expansion, corrosion control, the addition of catalysts, proper seals, water hammer control, automation devices and many others, would all be known to one skilled in the art and are not described herein.

While the discussion herein has been based on the treatment of contaminated water, it should be appreciated that the method and apparatus described is not limited to water treatment but rather has applicability to the treatment of any fluid which exhibits multiple phases of liquid and vapor at a particular temperature and pressure and therefore substantially improves the material treatment art and otherwise accomplishes the objects of the invention.

I claim:

1. A method of treating a continuously flowing water contaminated with organic and inorganic materials comprising the steps of feeding the contaminated water into the top of a hydraulic downdraft column; conducting the contaminated water from the bottom of said downdraft column into a reaction chamber; providing sufficient heat energy in said reaction chamber to maintain the temperature of the contaminated water at approximately the temperature necessary to create supercritical water conditions; maintaining the pressure in said reaction chamber at approximately the pressure necessary to create supercritical water conditions; said heat energy and pressure causing a chemical reaction to take place in said reaction chamber resulting in treated water, including at least water, particulates and precipitates, of a lower specific gravity; imparting centrifugal force to the treated water to divide the treated water into a particulate and precipitate enriched portion and a particulate and precipitate depleted portion; conducting one portion of the treated water into the bottom of a first hydraulic updraft column and the other portion of the treated water into the bottom of a second hydraulic updraft column whereby the pressure at the bottom of said updraft columns causes the portions of the treated water to rise separately in said updraft columns; and removing the portions of the treated water from the top of said updraft columns.

2. A method according to claim 1 wherein the step of feeding the contaminated water includes the step of pumping the contaminated water.

3. A method according to claim 1 wherein the step of maintaining the pressure includes the step of controlling the height of said downdraft column.

4. A method according to claim 3 wherein the step of maintaining the pressure further includes the step of restricting the rate of flow in said downdraft and said updraft columns.

5. A method according to claim 1 wherein the step of providing heat energy maintains the temperature of the contaminated water at approximately 706° F.

6. A method according to claim 1 wherein the step of maintaining the pressure results in a pressure in said reaction chamber of approximately 3207 psi.

7. A method according to claim 6 wherein the step of providing heat energy maintains the temperature of the contaminated water at approximately 706° F.

8. A method according to claim 1 wherein the step of providing sufficient heat energy includes the step of deriving the sufficient heat energy from said chemical reaction.

9. A method according to claim 8 wherein the step of providing sufficient heat energy further includes the step of deriving the sufficient heat energy from the addition of oxygen.

10. A method according to claim 9 wherein the step of providing sufficient heat energy further includes the step of deriving the sufficient heat energy from the addition of fuel.

11. A method according to claim 1 further comprising the step of insulating the hydraulic downdraft column.

12. A method according to claim 11 wherein the step of insulating includes the step of substantially evacuating the space around the downdraft column.

13. A method according to claim 1 further comprising the step of preserving heat in the downdraft column.

14. A method according to claim 13 wherein the step of preserving heat includes the step of reflecting heat from the downdraft column back to the downdraft column.

15. A method according to claim 1 further comprising the step of controlling the flow of water in the downdraft column and in the updraft columns.

16. A method according to claim 1 further comprising the step of separating the solids from the liquid in the treated water.

17. A method according to claim 1 further comprising the step of initiating the process by preheating the downdraft column, the reaction chamber and the updraft columns.

18. A method according to claim 1 further comprising the step of periodically cleaning the downdraft column, the updraft columns and the reaction chamber.

19. A method according to claim 1 further comprising the step of diluting the contaminated water prior to feeding the same to the downdraft column.

20. A method according to claim 1 further comprising the step of enhancing the organic content of the contaminated water prior to feeding the same to the downdraft column.

21. Apparatus for treating a continuously flowing water contaminated with organic and inorganic materials comprising means defining a first vertical passageway receiving the contaminated water near the top thereof and being of a height such that the pressure at the bottom thereof will be approximately the pressure necessary to create supercritical water conditions; a reaction chamber near the bottom of said first vertical passageway; means in said reaction chamber to heat the contaminated water to approximately a temperature necessary to create supercritical water conditions; said pressure and temperature causing a chemical reaction to take place in said reaction chamber whereby the contaminated water is converted to treated water at a lower specific gravity; said treated water including at least water, particulates and precipitates; means within said reaction chamber to impart a centrifugal force to said treated water to divide the treated water into a particulate and precipitate enriched portion and a particulate and precipitate depleted portion; and means defining separate second and third vertical passageways each communicating with said reaction chamber to respectively receive said particulate and precipitate enriched portion of said treated water and said particulate and precipitate depleted portion of said treated water; whereby the materials in said second and third passageways flow upwardly to the top thereof.

22. Apparatus according to claim 21 wherein said means defining a first vertical passageway includes a first casing extending into a bore in the earth, and a second casing spaced within and concentric with said first casing, the space between said first and second casings defining said first vertical passageway.

23. Apparatus according to claim 22 further comprising a third casing spaced around and concentric with said first casing defining an annulus between said first casing and said third casing.

24. Apparatus according to claim 23 further comprising means to substantially evacuate said annulus between said first casing and said third casing.

25. Apparatus according to claim 23 wherein said third casing is spaced from the strata defining the bore in the earth and further comprising insulation means in the space between said third casing and the strata.

26. Apparatus according to claim 23 further comprising a reflective surface on the wall of said third casing which faces said first casing.

27. Apparatus according to claim 21 wherein said means defining a first vertical passageway includes a first casing extending into a bore in the earth, and a second casing spaced within and concentric with said first casing, the space between said first and second casings defining said first vertical passageway and wherein said means defining said second and third vertical passageways include a third casing spaced within and concentric with said second casing and a fourth casing spaced within and concentric with said third casing, the space between said second casing and said third casing defining said second vertical passageway and the space between said third casing and said fourth casing defining said third vertical passageway.

28. Apparatus according to claim 27 wherein the inside of said second casing extends around and defines the outside of said reaction chamber and said third casing terminates above said reaction chamber.

29. Apparatus according to claim 28 wherein said means to impart centrifugal force to said treated water includes rib means on the outside of said fourth casing and extending outward into said reaction chamber.

30. Apparatus according to claim 29 wherein said rib means extend spirally around the outside of said fourth casing to impart the centrifugal force to the treated water.

31. Apparatus according to claim 30 wherein the bottom of said second casing tapers downwardly inwardly around said reaction chamber to assist the division of said treated water initiated by said means to impart centrifugal force to said treated water.

32. Apparatus according to claim 27 further comprising a pipe spaced within and concentric with said fourth casing, said pipe and the space between said pipe and said fourth casing communicating with said means to heat.

33. Apparatus according to claim 32 further comprising means to provide said means to heat with oxygen through said pipe and means to provide said means to heat with fuel through the space between said pipe and said fourth casing.

34. Apparatus according to claim 21 further comprising surge chamber means receiving the contaminated water and supplying the same to the top of said first vertical passageway.

35. Apparatus according to claim 34 further comprising pump means to selectively assist the supplying of the contaminated water to the top of said first vertical passageway.

36. Apparatus according to claim 21 further comprising means selectively communicating with the top of said second and third vertical passageways to provide cleaning fluid to the same.

37. Apparatus according to claim 2 further comprising means communicating with the top of said second and third passageways to separately receive the materials from said second and third passageways therein.

38. Apparatus according to claim 37 wherein said means communicating with the top of said second and third passageways includes separation tanks permitting the segregation of solids from liquids in the materials received from said second and third passageways.

39. Apparatus according to claim 21 further comprising means communicating with the top of said second and third passageways to control the flow of material in said first, second and third passageways.

* * * * *